United States Patent Office 3,407,363
Patented Oct. 22, 1968

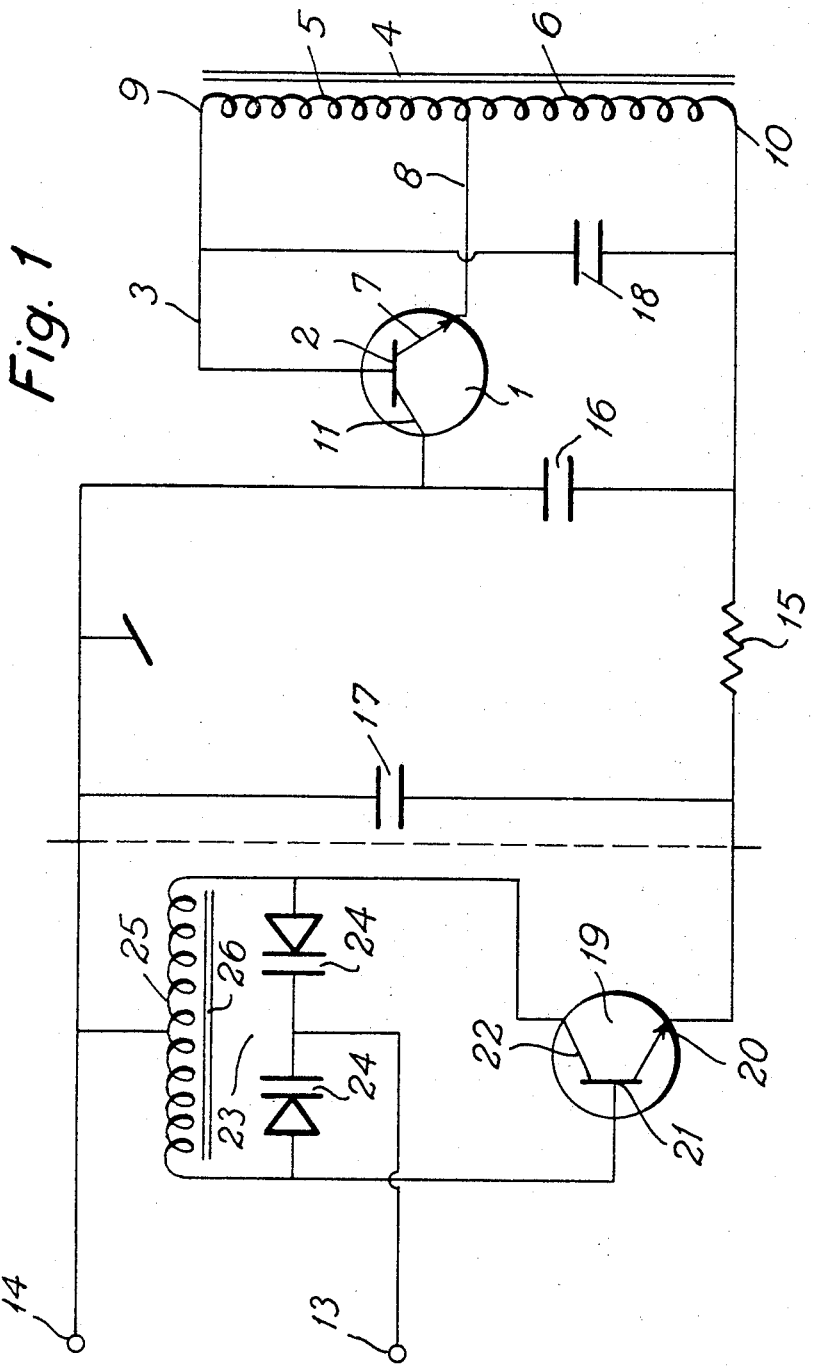

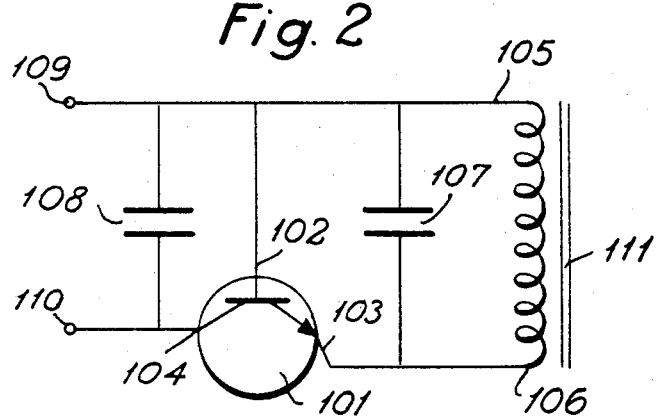
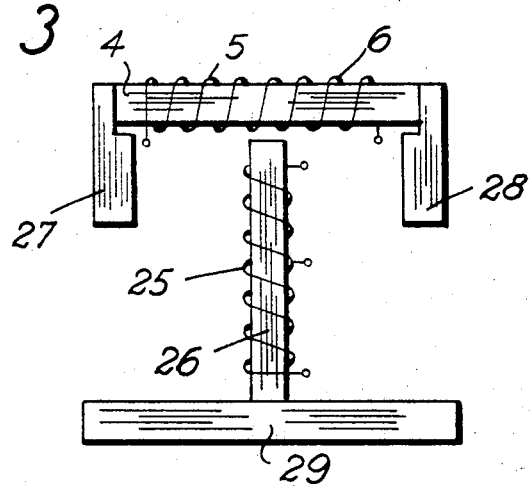
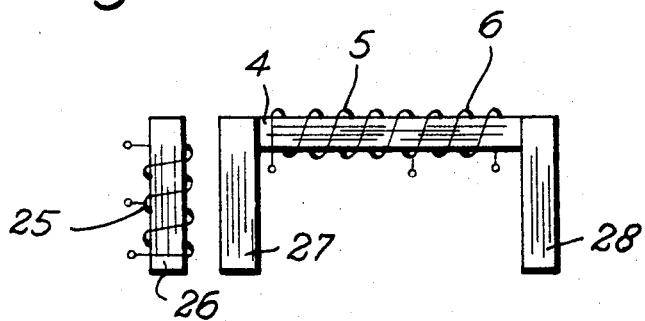

3,407,363
POWER SOURCE PREFERABLY FOR IMPLANTABLE, ELECTRIC UNITS AND AN H.F. TRANSISTOR TRANSMITTER FOR OPERATING SAME
Niels Edmund G. Kaiser, Linde Alle 36, Copenhagen, Vanlose, Denmark, and Per Roland Kadefors, Badvadersgatan 19, Goteborg, Sweden
Filed Dec. 28, 1966, Ser. No. 605,262
Claims priority, application Sweden, Dec. 30, 1965, 6,706/65; Aug. 2, 1966, 4,003/66
9 Claims. (Cl. 331—117)

ABSTRACT OF THE DISCLOSURE

The invention relates to a power source, which can receive energy from electromagnetic waves and produce a stabilized direct current voltage for an implantable electric device such as an oscillator, with a coil within which alternating current is induced by the electromagnetic waves and a transistor attached to the coil for rectifying the alternating current. The emitter of the transistor can be connected directly to one of the coil terminals such as an outer terminal and the base directly connected to another terminal such as the other outer terminal or a midpoint terminal so that the voltage between a first output terminal at the collector and a second output terminal connected to one of the coil terminals other than the terminal connected to the emitter is substantially constant provided the strength of the electromagnetic waves exceeds a minimum value. Core concentrators can be deposited about the core of the coil and the output of the power source applied to a low frequency filter. The power source can be used with a Hartley oscillator with two series connected capacity diodes.

---

The invention relates to an electric power unit energized by the transmission to it of an electromagnetic wave field which induces a voltage in a coil disposed in the electric circuit of the unit, the said induced alternating voltage being rectified by means of a transistor.

It is known to use myoelectric potentials for servo-control of artificial organs. Such a servo-control may be effected simply by placing electrodes on the skin and causing the amplified signals herefrom to be incorporated in the control.

If a less noise-activated and consequently more reliable control signal is desired, it is, however, necessary to provide an electric amplifier beneath the skin. Such an amplifier is provided with electrodes which directly receive the myoelectric signals transmitted by the individual muscle. Thus, disturbing signals from the surrounding muscles are avoided. The said signal from the muscle is further utilised for modulating a high frequency oscillatory circuit in the amplifier of the unit, and the said modulated oscillation is transmitted in the form of corresponding electromagnetic waves which are intercepted outside the body. The signal received is amplified and demodulated to be used for the aforesaid control of the artificial organs. The power source hitherto used for the amplifier has consisted in built-in mercury batteries which have a long life. The batteries had to be replaced at intervals, which required a slight surgical operation, and the said batteries further involved the risk of leakage. By such a leakage very poisonous substances penetrate into the organism and implantation of units with batteries is therefore only made in case of vital measures being necessary.

With the advanced technique within the field of semiconductors it was at length within the limits of possibility to construct a power source energized from outside by accumulating electromagnetic power transmitted from an electromagnetic high frequency wave field. Thus, various couplings with semiconductor elements have also been successfully used for similar purposes such as for analysing the acidity of the alimentary canals.

Physicians, however, have refrained from using such couplings for implanted units for the purpose of using the units in connection with the control of artificial organs since the couplings produced so far involved heavy disadvantages when used for this purpose. Thus, the necessary electronic transmitter equipment had to be of unreasonable dimensions owing to the heavy power consumption of the couplings and their low efficiency. If, for example, a transformer unit is assumed to be realised with a single oscillatory circuit coupled to an antenna and with a diode for rectifying the voltage induced, a considerable amount of power will be lost owing to the inevitable drop of the diode voltage, and the rectified voltage would furthermore be dependent on variations in the electromagnetic field strength. This latter would among other things involve a distortion of the signal transmitted from the connected internal F.M. transmitter, which, again, would entail a risk of misinterpretation of the signal. These drawbacks are eliminated with the power source according to the invention.

The main object of the invention is to provide a power unit of the above-mentioned kind by which is obtained that the base-emitter circuit of the transistor besides controlling the rectifying effect of the transistor is used for stabilizing the produced direct current for the output terminals of the power unit so that this direct current—when the transistor is active—assumes a mainly constant value independent of the strength of the electromagnetic wave field.

An essential feature of one of the said power units is that the emitter electrode of the transistor is connected to a tap provided on the coil and that the base electrode is connected to one outer end of the coil, whereas when the coil is in an electromagnetic alternating field of a certain minimum strength, the other outer end of the coil together with the collector electrode of the transistor forms the output terminals which is essentially giving off a direct current for operating the transmitter unit.

It should be pointed out that it is not novel to use a transistor as rectifying component, but with the special arrangement of the transistor in the circuit the special qualities possessed by the base emitter section of the transistor are utilised.

Thus, the result obtained is that the voltage drop corresponding to the normal diode voltage drop, now lying across the emitter-collector electrodes, has been reduced to a value less than 0.06 volt, and a further result obtained is that the ignition voltage necessary for all the semiconductors is transferred to lie between the base and collector electrodes.

At the very weak electromagnetic field strengths the voltage induced is not sufficient to attain the ignition voltage of the semiconductor, and there will consequently not be any rectification.

At weak field strengths the major part of the current flow is through the collector and emitter electrodes, abt. 20 μa., only a fraction passing through the base electrode. If the tap is placed in such manner that the voltages herefrom to each end of the coil are approximately equal, it will be seen that the circuit is working almost without loss at these field strengths.

As soon as the ignition voltage across the base-emitter electrodes has been attained, the voltage will, owing to the diode effect, only increase slowly with increasing current flow through the base electrode, as a result of which the voltage across the solenoid will be maintained by the transistor despite an increasing electromagnetic field strength. Thus, the further advantage is obtained that the voltage across the electrodes through which the direct current flows remains constant when the electromagnetic field has attained a certain strength.

Another power source according to the invention which likewise utilises the qualities of the base-emitter section of a transistor has the essential feature that the emitter electrode of the transistor is connected to one outer end of the coil, whereas the base electrode is connected to the other outer end of the coil, by which the output terminals are constituted by the base electrode and the collector electrode.

The said power source has substantially the same qualities as the first mentioned power source.

The base-emitter circuit acts here in relation to the coil as a diode, that is, as long as the voltage is below or just around the ignition voltage, there is practically no current flow through the base electrode, whereas, when attempts are made to increase the voltage across the coil, the said flow of current will increase and thus prevent the base-emitter voltage from further increasing.

Further advantages obtained are that the coil need not be provided with a central tap and that the ripple voltage of the power source is easier to eliminate. Thus, it is only necessary to connect a single smoothing capacitor to the output terminals of the power source when the said power source is used in combination with the transmitter described in the following.

According to the invention the accumulation of power may be frequency selective in relation to the electromagnetic waves, for example thereby that the outer electrodes of the coil are connected to a tuning capacitor which permits tuning of the unit to ensure optimal accumulation of power.

Furthermore, according to the invention the direct voltage may be smoothed by means of a low-pass filter connected to the two-pole, such a filter being designed of adequately small dimensions to allow it to be arranged in a unit of the kind involved here.

If according to the invention the coil is formed as a solenoid enclosing a ferrite core, a concentration of the electromagnetic field around the coil is obtained, by which a larger part of the power transmitted by the external transmitter is utilised. In view of the carrier the said transmitter has to be made as small as possible.

For further amplifying the alternating voltages generated in the coil the ferrite core may be provided with concentrators at its ends.

The internal transmitter is of a very special kind, operated by the very low supply voltage, below 0.5 volt, supplied by the power source.

The oscilltaor of the transmitter is of the Hartley type, in which the two oppositely directed alternating voltages of the oscillator are fed to the base electrode and the collector electrode, respectively, of a transistor which is coupled as emitter. An essential feature according to the invention is that the said supply is effected by directly connecting the base and collector electrode of the transistor each to its separate outer end of the coil of the oscillator simultaneously with supply voltage being given across the central tap of the coil and the emitter electrode. It will be appreciated that in this way the identical direct current potential is obtained on the base electrode and the collector electrode, respectively, or, in other words, an extremely high potential is imparted to the base electrode compared with that of the collector electrode. The last mentioned arrangement involves that the oscillator starts oscillating at a very low operating voltage.

The transmitter has the additional advantage that it needs no more current than what the power source is capable of supplying, about 20 μa. Consequently, it works very economically and with an amplitude voltage of around 0.5 volt. The signal is transmitted via a ferrite core mounted in the oscillator coil, which increase the Q of the oscillator circuit and the electromagnetic efficiency.

The transmitter may be modulated in various manner. According to the invention this is effected by converting the oscillatory circuit so that the capacitive part of the oscillatory circuit consists of two series-connected capacity diodes of opposed polarity, whereas in the connection between the capacity diodes there is provided a tap which together with the coil tap is connected to signal input electrodes for frequency modulation of the signal.

In addition to thus dispensing with the usual oscillator condenser, there is further obtained a high input impedance in relation to the myo signals, dependent upon the comparatively small losses in the capacity diodes.

The transmission power is increased if according to the invention concentrators are provided at the ends of the ferrite core of the oscillator. One of the concentrators may be constituted by one or more of the ferrite cores of the power source.

Furthermore one concentrator may according to the invention be common for the ferrite core of the oscillator coil of the power source, which makes it possible to make the unit of a particularly slender shape.

The invention will now be further described on the basis of a few embodiments of same with reference to the accompanying drawings, in which:

FIGURE 1 shows a circuit diagram of an embodiment of a power source and transmitter according to the invention, given by way of example, FIGURE 2 shows another circuit diagram of another embodiment of a power source according to the invention, likewise by way of example, and FIGURES 3 and 4 show examples of the construction of concentrators for coils incorporated in the circuits according to the invention.

In the drawing, FIGURE 1, transistor 1 is an n-p-n barrier layer silicon transistor the base electrode 2 of which is connected through a wire 3 with one end 9 of a coil wound on a ferrite core 4, the said coil being divided into two parts 5 and 6 by a wire 8 leading to the emitter electrode 7 of the transistor. Across the ends of the coil is mounted a capacitor 18 of 20–30 pf. so that when a transmitter of 3 mHz. giving a signal of 20 mw. is mounted outside the place where the unit is implanted, the other end 10 of the coil together with the collector electrode 11 of the transistor 1 will form a two-pole for the supply of a miniature transmitter enclosed in the unit. The parts of the said transmitter are shown to the left of a stippled line in FIGURE 1, and the transmitter has gilded signal input electrodes 13 and 14 placed at the muscles involved by a surgical operation.

The ferrite core 4 may in order to improve its reception of energy be provided with concentrators (not shown) at its ends.

During operation there is about 0.55 volt across one half 5 of the coil, whereas there is about 0.67 volt across the other half 6. The collector current is about 20 μa., whereas the base current varies from about 1 to 1000 μa., dependent upon the electromagnetic field strength.

Between the two-pole and the transmitter is inserted a low-pass filter consisting of a resistor 15 of 10 KΩ and two capacitors 16 and 17 of 2 and 1 nf., respectively, by which the supply voltage to the transmitter is smoothed.

The 430 kHz. signal of the transmitter is received by an external F.M. receiver (not shown) which may be built together to form a unit with the aforesaid transmitter (no unit shown either).

The transistor 19 of the transmitter shown to the left of the stippled line is likewise an n-p-n silicon transistor the emitter electrode 20 of which is connected to the output of the low-pass filter between the capacitor 17 and the resistor 15, whereas the base and collector electrodes 21 and 22 are each connected to their separate outer end of the oscillator coil of the oscillatory circuit 23, the capacitive part of which is constituted by the two capacity diodes 24. These are connected in such manner that they are of opposite polarity in relation to the alternating voltages, whereas they are of identical polarity in relation to the signal voltage. This involves that the total capacity in relation to the alternating voltage varies as soon as a control signal is produced, by which a frequency modulation of the oscillator frequency is produced. The other control electrode 14 is together with the other electrode from the supply voltage, that is, the collector electrode 11, connected to the central point 25 of the oscillator coil. By introducing the electrode 14 at this point alternating voltages from the oscillator on the signal input electrodes are avoided. The transistor is thus fed with current through the half-branches of the oscillator coil down to the emitter electrode 20. It is, by the way, operated in class C and the total power consumption is about 20 microamps and at this consumption the oscillator voltage attains an amplitude voltage of 0.25 volt. The oscillator coil is in the same manner as the power source coil provided with a ferrite core 26.

FIGURE 2 shows another circuit diagram of another power source according to the invention.

An n-p-n silicon transistor 101 has its base electrode 102 and emitter electrode 103 galvanically connected to one outer end 105 and the other outer end 106, respectively, of an induction coil 112 which is provided with a ferrite core 111. Across the coil is furthermore connected a capacitor 107 which together with the coil constitutes an oscillatory circuit tuned to the frequency of the electromagnetic field received.

A smoothing capacitor 108 is connected to the base electrode 102 and the collector electrode 104, respectively, of the transistor to smooth the direct voltage given off by the power source at these electrodes, the said direct voltage being given off at a pair of terminals 109 and 110 connected here.

The said embodiment of the power source according to the invention gives off a direct voltage of about 0.5 volt, which is sufficient to operate a smaller circuit, for example the F.M. transmitter described with reference to FIGURE 1.

FIGURE 3 shows an arrangement of the ferrite cores with concentrators. 27 and 28 are concentrators for the power source core 4, whereas 29 together with the core 4 and 27, 28 acts as concentrators for the oscillator core 25 through which the frequency modulated signal is transmitted.

FIGURE 4 shows another concentrator arrangement in which the core 27 acts as concentrator for both cores 4 and 26. The arrangement illustrated in FIGURE 4 is very suitable for units to be of slender design. These concentrators are suitable both for increasing the power of the power source and the transmission power of the sender by approximately the double amount.

Both the power source and the transmitter may be constructed by assembling all the components in a printed circuit, after which the whole aggregate may be enclosed in a casting of synthetic resin, to which the biological tissue is neutral.

With the aforesaid gilding of the electrodes a further result obtained is that the tissue is not irritated or injured. Owing to the said improved efficiency of the circuit and the use of microcomponents the entire unit need not take up more space than 0.5 cm.$^3$.

The examples given in the foregoing described how the implantable unit may be used in connection with registration of myoelectric signals from an individual muscle and how it is to be utilised for controlled artificial organs. However, implantable units may also be used for other functions such as activation of muscles. With reference hereto may be mentioned aparatus such as pacers and stimulators, for example for urination. In all such units requiring an electric power source, the power source according to the invention may be used.

What we claim and desire to secure by Letters Patent is:

1. A power source for receiving energy from electromagnetic waves transmitted to said source and producing a stabilized, direct current voltage comprising:
    a coil having at least two coil terminals, said waves inducing an alternating current in said coil, and
    a transistor having a base, collector and emitter for rectifying said alternating current, said emitter being directly connected to one of said coil terminals and said base being directly connected to another of said terminals so the voltage between a first output terminal at said collector and a second output terminal at one of said coil terminals other than the coil terminal connected to said emitter is a substantially constant direct current voltage, provided the strength of said electromagnetic waves exceeds a given strength.

2. A power source as in claim 1 wherein said coil has two outer terminals and including a tuning capacitor electrically connected across said outer terminals of said coil.

3. A power source as in claim 1 including a low pass filter connected to said first and second output terminals for smoothing said direct current voltage produced between said first and second output terminals.

4. A power source as in claim 1 including a ferrite core enclosed within said coil.

5. A power source as in claim 4 including core concentrators disposed about the ends of said core.

6. A high frequency transmitter adapted to operate on energy from electromagnetic waves comprising:
    a first coil having at least two coil terminals, said waves inducing an alternating current in said coil,
    a transistor having a base, collector and emitter for rectifying said alternating current, said emitter being directly connected to one of said coil terminals and said base being directly connected to another of said coil terminals so the voltage between a first output terminal at said collector and a second output terminal at one of said coil terminals other than the coil terminal connected to said emitter is a substantially constant direct current voltage provided the strength of said electromagnetic waves exceed a given strength, and
    a Hartley oscillator, including a second coil having a central point terminal and two outer terminals, said central point terminal being connected to one of said output terminals, and a second transistor having a base, collector, and emitter, said base being connected to one of said outer terminals of said second coil, said collector being connected to the other of said outer terminals of said second coil and said emitter being connected to the other of said output terminals.

7. A transmitter as in claim 6 wherein said Hartley oscillator includes two series connected capacity diodes connected together in opposed polarity, the ends of said diodes connected together being connected to signal input means for frequency modulation of the oscillator signal and the ends of said diodes not connected together being each connected to a different one of said outer terminals.

8. A transmitter as in claim 6 including a first ferrite core enclosed within said first coil, a second ferrite core enclosed within said second coil and concentrators disposed about the ends of said first and second cores, one of said concentrators for said second core being said first core.

9. A transmitter as in claim 8 wherein said second coil is disposed in parallel with a concentrator for said first core.

References Cited

UNITED STATES PATENTS

| | | | |
|---|---|---|---|
| 2,813,242 | 11/1957 | Crump | 331—185 |
| 2,918,573 | 12/1959 | Hollmann | 331—185 |
| 3,253,588 | 5/1966 | Vuilleumier et al. | 128—2 |
| 3,290,618 | 12/1966 | Leysieffer | 331—177 |

OTHER REFERENCES

Kuck et al.: IEEE Transactions on Bio-medical Electronics, "A Miniature Transmitter for Telemetering Muscle Potentials," pp. 117–119, July 1963, vol. BME-10, No. 3.

JOHN KOMINSKI, *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,407,363                                              October 22, 1968

Niels Edmund G. Kaiser et al.

It is certified that error appears in the above identified patent and that said Letters Patent are hereby corrected as shown below:

In the heading to the printed specification, line 9, "Sweden" should read -- Denmark --.

Signed and sealed this 10th day of March 1970.

(SEAL)
Attest:

Edward M. Fletcher, Jr.                          WILLIAM E. SCHUYLER, JR.
Attesting Officer                                     Commissioner of Patents